US006963486B2

(12) United States Patent
Kwitek

(10) Patent No.: US 6,963,486 B2
(45) Date of Patent: *Nov. 8, 2005

(54) HAND PADS FOR LAPTOP COMPUTERS AND OTHER ELECTRONIC DEVICES

(76) Inventor: Benjamin J. Kwitek, 1061 Valley View Dr., Canon City, CO (US) 81212

( * ) Notice: Subject to any disclaimer, the term of this patent is extended or adjusted under 35 U.S.C. 154(b) by 96 days.

This patent is subject to a terminal disclaimer.

(21) Appl. No.: 10/458,256
(22) Filed: Jun. 11, 2003

(65) Prior Publication Data
US 2003/0231462 A1 Dec. 18, 2003

Related U.S. Application Data

(60) Provisional application No. 60/388,367, filed on Jun. 14, 2002.

(51) Int. Cl.⁷ ............................................. G06F 1/16
(52) U.S. Cl. ..................... 361/683; 361/680; 361/681
(58) Field of Search ............................ 361/679–681, 361/683, 686

(56) References Cited

U.S. PATENT DOCUMENTS 6,385,037 B2 * 5/2002 Howell et al. .............. 361/683

* cited by examiner

Primary Examiner—Yean-Hsi Chang
(74) Attorney, Agent, or Firm—Welsh & Flaxman LLC

(57) ABSTRACT

A laptop computer includes a one-piece, unitary keyboard housing and a monitor. The keyboard housing supports a plurality of keys for manipulation by a user of the computer. The laptop computer includes at least one hand pad selectively secured to the keyboard housing. The at least one hand pad is positioned adjacent the plurality of keys for supporting the hand of a user as the user manipulates the plurality of keys. The hand pad is a substantially flat viscoelastic pad. The pad includes a bottom surface shaped and dimensioned to rest firmly upon the keyboard housing and a top surface contoured to comfortably support a hand of a user. The hand pad also includes an adhesive layer applied to the bottom surface allowing for ready attachment to the laptop housing.

20 Claims, 4 Drawing Sheets

HAND PADS FOR LAPTOP COMPUTERS AND OTHER ELECTRONIC DEVICES

CROSS-REFERENCE TO RELATED APPLICATIONS

This application claims priority of U.S. Provisional Application Ser. No. 60/388,367, entitled "HAND PADS FOR LAPTOP COMPUTERS AND OTHER ELECTRONIC DEVICES", filed Jun. 14, 2002. In addition, the present application relates to U.S. Pat. No. 6,336,614, entitled "CONFORMABLE PORTABLE COMPUTER HAND PADS", which issued Jan. 8, 2002.

BACKGROUND OF THE INVENTION

1. Field of the Invention

This invention relates to ergonomic hand pads for laptop computers and other electronic devices. The hand pads support the user's wrist, palm, fingers and possibly forearm. In particular, the invention relates to soft, conforming hand pads constructed for after-market attachment with the keyboard body of portable laptop (or notebook) computers, personal digital assistants, tablet-type computers and other electronic devices including a hand support surface.

2. Background of the Invention

The use of computer input devices such as computer keyboards, mice, tracking pads and other similar devices is becoming increasingly prevalent in modem computing. However, continuous use of these input devices is often uncomfortable, and sometimes hazardous to the user. For example, use of keyboards, mice and tracking pads requires positioning the user's hand in a generally horizontal position which can cause the tendons in the hand to lie in a strained position, often resulting in discomfort.

Simple flat pads are currently available for supporting a user's hand as he or she manipulates the input devices or desktop computers. Such pads have been further refined to provide contoured surfaces on which to support the user's hand.

Unfortunately, these prior attempts have been met with only limited success, since they often fail to conform to a specific user's hands and, therefore, only offer limited relief from the pressures being applied as the user manipulates his or her input device. These devices also were designed for desktop computers and full size keyboards. A need, therefore, exists for a computer pad offering users a soft and individually conforming hand surface for portable computers. The present invention provides such a computer hand pad.

SUMMARY OF THE INVENTION

It is, therefore, an object of the present invention to provide a laptop computer including a one-piece, unitary keyboard housing and a monitor. The keyboard housing supports a plurality of keys for manipulation by a user of the computer. The laptop computer includes at least one hand pad selectively secured to the keyboard housing. The at least one hand pad is positioned adjacent the plurality of keys for supporting the hand of a user as the user manipulates the plurality of keys. The hand pad is a substantially flat viscoelastic pad. The pad includes a bottom surface shaped and dimensioned to rest firmly upon the keyboard housing and a top surface contoured to comfortably support a hand of a user. The hand pad also includes an adhesive layer applied to the bottom surface allowing for ready attachment to the laptop housing.

It is also an object of the present invention to provide a laptop computer wherein the hand pad is a viscoelastic solid-phase material.

It is another object of the present invention to provide a laptop computer wherein the viscoelastic solid-phase material is a styrenic thermoplastic elastomer.

It is a further object of the present invention to provide a laptop computer wherein the viscoelastic material is a viscous liquid material contained within an elastomeric bag.

It is also another object of the present invention to provide a laptop computer wherein the viscous liquid material is a silicone gel or thermoplastic elastomer.

It is still another object of the present invention to provide a laptop computer wherein the hand pad has a thickness of approximately 0.25 mm to approximately 5.00 mm.

It is yet another object of the present invention to provide a laptop computer wherein the hand pad has a thickness which is no greater than 5.00 mm.

It is also an object of the present invention to provide a laptop computer wherein the hand pad has a hardness, as measured by a Shore A Durometer, which is less than 55.

It is a further object of the present invention to provide a laptop computer wherein the hand pad has a hardness, as measured by a Shore A Durometer, which is between 5 and 30.

It is another object of the present invention to provide a laptop computer wherein the pad includes a thermochromic agent allowing the hand pad to change color during use a phase change material agent allowing the hand pad to regulate temperatures during.

It is also an object of the present invention to provide a hand pad adapted for selective attachment to a laptop computer, personal digital assistant or other electronic devices. The hand pad includes a flat viscoelastic pad. The pad includes a bottom surface shaped and dimensioned to rest firmly upon a machine housing and a top surface contoured to comfortably support a hand of a user. The hand pad further includes an adhesive layer applied to the bottom surface of the pad, the adhesive allowing for ready attachment of the pad to the laptop housing. The hand pad also includes a release sheet covering the adhesive layer such that the adhesive layer may be protected until such a time that one desires to apply the pad to the laptop computer, personal digital assistant or other electronic device.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
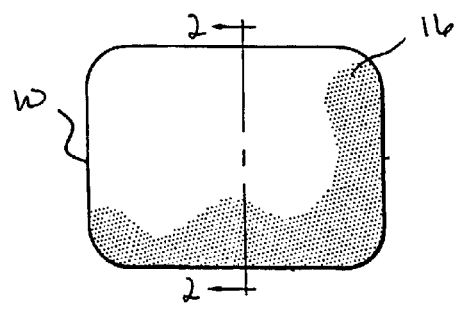
FIG. 1 is a top view of a hand pad constructed from a solid, soft, viscoelastic material.
Figure 2:
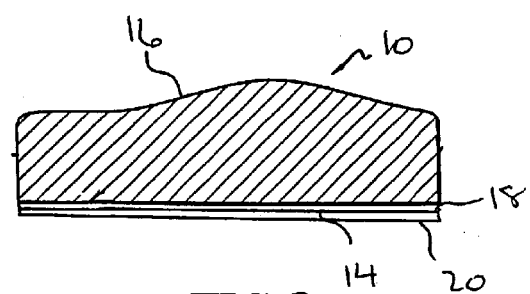
FIG. 2 is a cross sectional view of the hand pad disclosed in FIG. 1.

With reference to FIGS. 1 to 9, the various embodiments of the present invention are disclosed. FIG. 1 shows a top view of a responsive, viscoelastic solid hand pad 10 utilized in accordance with the present invention and FIG. 2 shows a cross-sectional view of the same hand pad. As discussed above, the present hand pad 10 is designed for use with laptop computers, personal digital assistants, tablet-type computers and other electronic devices. However, the present disclosure will focus upon its use in conjunction with laptop computers, although those skilled in the art will certainly appreciate the manner in which the following teachings may be applied in the use of other electronic devices.

The hand pad 10 provides a soft, conforming surface on which the user may rest his or her hands while typing or operating a mouse, or similar tracking device. The materials used for the hand pad 10 provide a soft and smooth surface for the user's hands. Preferably, the hardness of the materials used for the hand pad, as measured by a Shore A Durometer, is less than 55.

Referring again to FIGS. 1, 2 and 5 through 9, a flat viscoelastic, solid hand pad 10 is shown. The hand pad 10 may take a variety of shapes depending upon the support surface provided on the laptop computer 12, or other electronic device, to which it is attached, and those skilled in the art will appreciate the many shapes which may be utilized within the spirit of the present invention.

The hand pad 10 includes a bottom surface 14 and a top surface 16. The bottom surface 14 is generally flat such that the hand pad 10 may be selectively positioned to rest firmly on a flat support surface. The top surface 16 is a generally smooth shape. This top surface 16 shifts to conform with the applied shape when the weight of the user's hands is applied thereon. The top surface 16 may also be contoured by design to comfortably match the surface of a user's hand which will rest on the top surface 16 while the user types or operates a mouse.

An adhesive layer 18 is secured to the bottom surface 14 of the hand pad 10. The adhesive layer 18 allows for ready attachment of the hand pad 10 to a laptop computer 12. A release sheet 20 protects the adhesive layer 18. The release sheet 20 is placed over the adhesive layer 18 and remains secured to the adhesive layer 18 until it is selectively removed by a user prior to attaching the hand pad 10 to the laptop computer 12.

The adhesive layer 18 is designed/engineered so that it will not damage the flat surface of the laptop computer 12. In accordance with a preferred embodiment, the adhesive layer 18 is selected to permit selective attachment and release of the hand pad 10. The user may, therefore, remove and reposition the hand pads 10 along the surface of the laptop computer housing. While a selectively releasably adhesive layer 18 is disclosed in accordance with a preferred embodiment of the present invention, it is contemplated that a substantially non-releasably adhesive layer may be employed in accordance with alternate embodiments.

In accordance with the embodiment disclosed in FIGS. 1 and 2, the viscoelastic solid hand pad 10 is preferably a viscoelastic solid-phase polymer material. The viscoelastic solid-phase polymer material is preferably a styrenic thermoplastic elastomer containing, for example, KRATON, which is manufactured by Shell Chemical Company. Other viscoelastic materials which may be used are C-FLEX (which contains silicone) or SANTOPRENE. It should be appreciated that the styrenic thermoplastic elastomer containing, for example, KRATON, may be altered via chemical and manufacturing processes. This alteration would likely include the softening of the thermoplastic elastomer. The level of tack, especially on the top surface may also be moderated through the use of talc and other products. Other treatments may be used without departing from the spirit of the present invention. Where the viscoelastic solid hand pad 10 is formed from a responsive, and relatively viscoelastic solid-phase polymer material, the outer surfaces of the viscoelastic solid hand pad 10 are formed from the same viscoelastic material as the remainder of the viscoelastic solid hand pad 10.

In accordance with a preferred embodiment of the present invention, the hand pads 10 are formed via an injection molding process. The hand pads 10 are formed to be very thin so as to not drastically change the profile of the laptop computer's housing to which they are applied. In addition, the hand pads 10 should be thin enough that they do not interfere with closing of the laptop case or computer screen. With this in mind, and in accordance with a preferred embodiment of the present invention, the thickness should be no greater than approximately 5.00 mm and perhaps as thin as approximately 0.25 mm.

Figure 3:
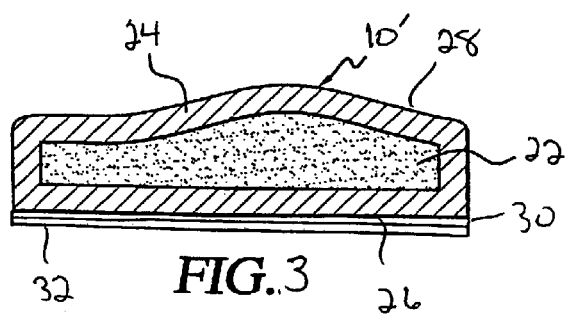
FIG. 3 is a cross-sectional view of an alternate embodiment of a hand pad comprising a gelatinous material interposed within a more resilient material.

In accordance with an alternate embodiment of the present invention, and as shown in FIG. 3, the viscoelastic solid-phase polymer construction disclosed with reference to FIGS. 1 and 2 is replaced with a viscous liquid material 22 contained in an elastomeric bag 24. Specifically, and with reference to FIG. 3, the viscoelastic gelatinous hand pad 10' is composed of a viscous liquid material 22 contained in an elastomeric bag 24. The viscous liquid 22 is preferably a silicone gel or oil and the elastomeric bag 24 is preferably a silicone sheet or a thermoplastic elastomer. While preferred materials are disclosed above, other materials exhibiting similar properties may be used without departing from the spirit of the present invention.

As with the embodiment disclosed with reference to FIGS. 1 and 2, the hand pad 10' disclosed with reference to FIG. 3 includes a bottom surface 26 and a top surface 28. The bottom surface 26 is generally flat, such that the hand pad 10' rests firmly on a flat support surface. The top surface 28 is contoured to comfortably match the surface of a user's hand which will rest on the top surface 28 while the user types or operates a mouse. An adhesive layer 30 is secured to the bottom surface 26 of the hand pad 10'. The adhesive layer 30 allows for ready attachment of the hand pad 10' to a laptop computer 12. Protection of the adhesive layer 30 is achieved by placing a release sheet 32 over the adhesive layer 30. The release sheet 32 will remain secured to the adhesive layer 30 until it is selectively removed by a user prior to attaching the hand pad 10' to the laptop computer 12.

Figure 4:
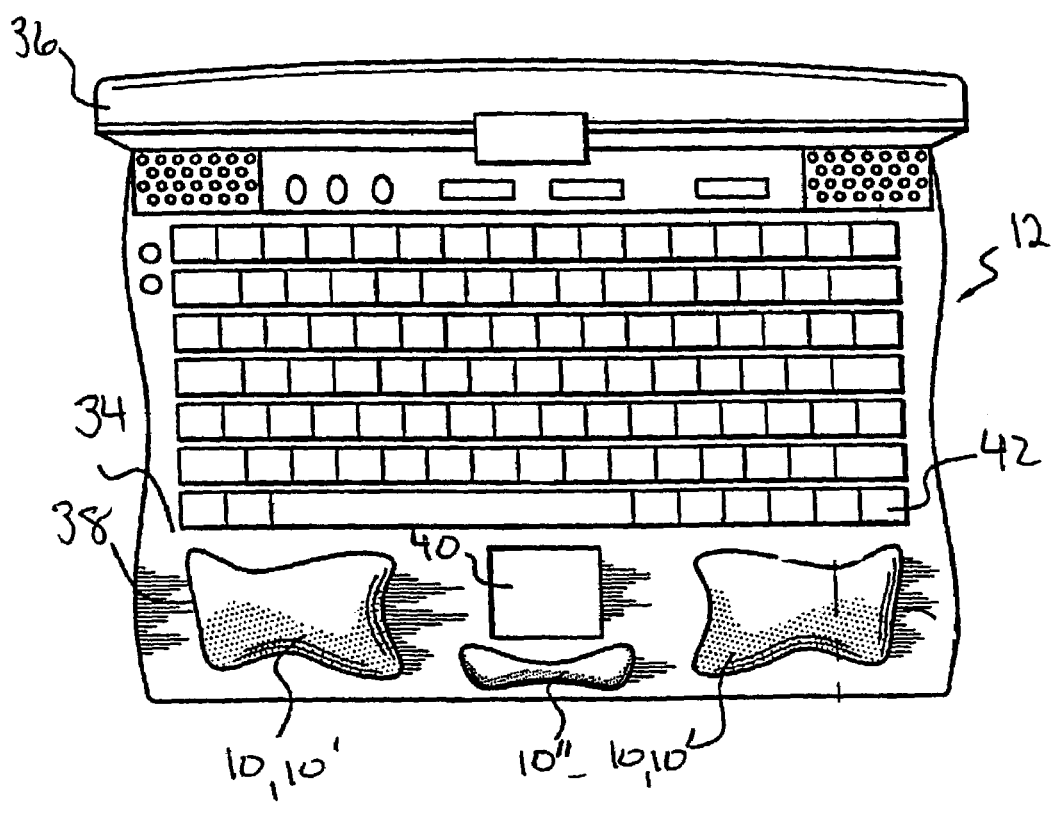
FIG. 4 is a top view of hand pads attached to the top surface of a laptop computer keyboard.
Figure 5:
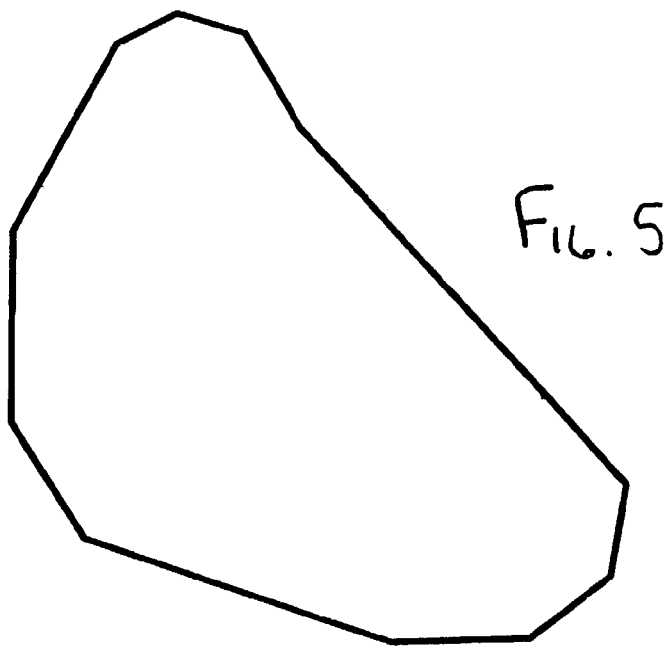
FIGS. 5 to 9 disclose a variety of hand pad shapes contemplated for use in accordance with the present invention.
Figure 6:
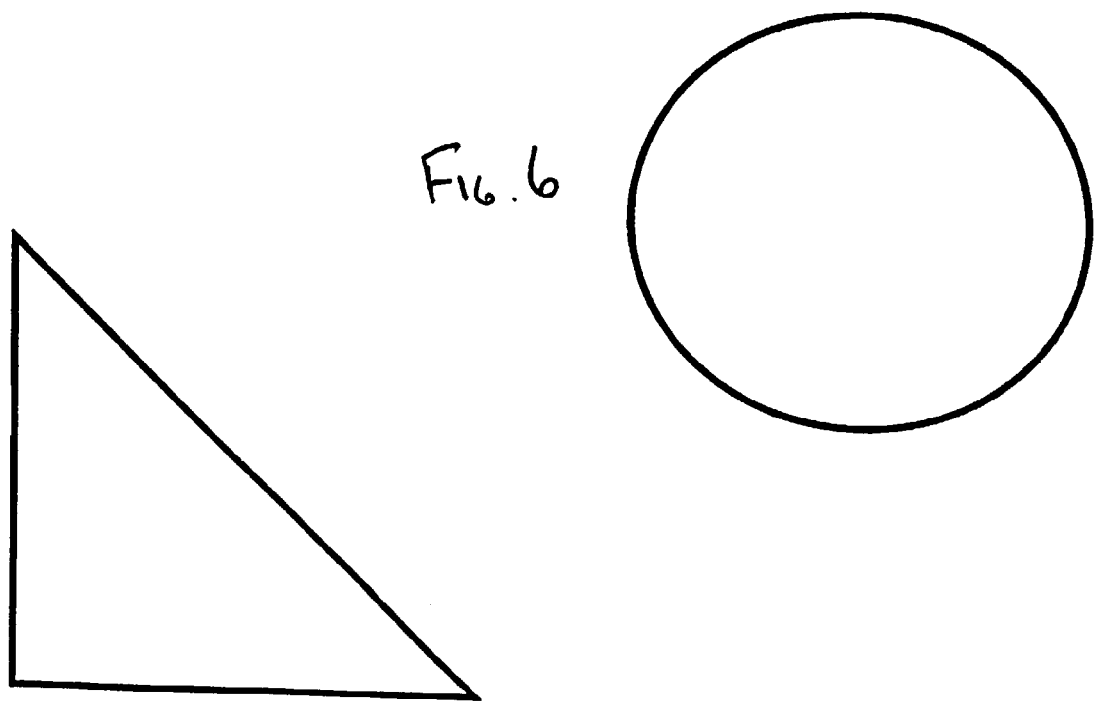
Figure 7:
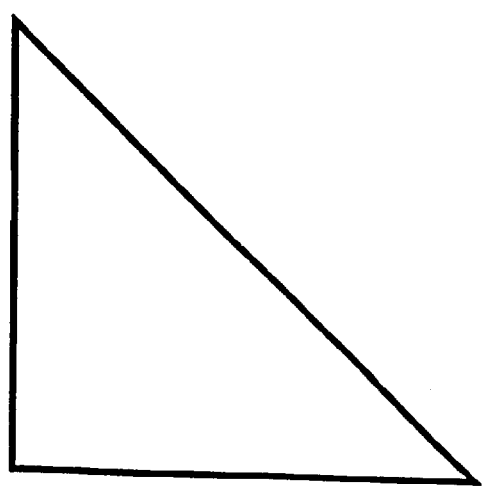
Figure 8:
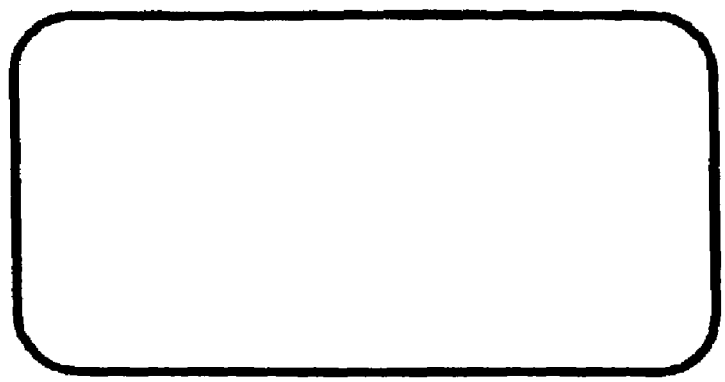
Figure 9:
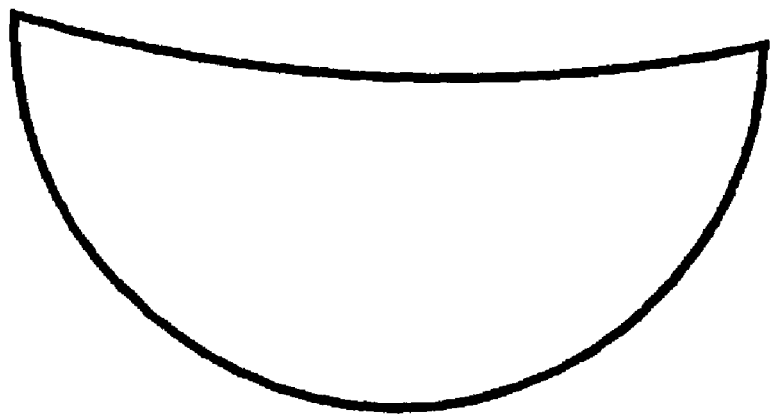

FIG. 4 shows two hand pads 10, 10' (of either the embodiment disclosed with reference to FIGS. 1 and 2 or the embodiment disclosed with reference to FIG. 3) used in conjunction with a laptop computer 12 having a keyboard housing 34 and a monitor 36. The first and second hand pads 10, 10' are strategically positioned on the top 38 of a keyboard housing 34 of the laptop computer 12, adjacent the side of the keyboard housing 34 where the user positions his or her hands for typing. The hand pads 10, 10' are secured to the housing 34 by simply removing the release sheet 20, 32, identifying the location upon the housing 34 a user wishes to place the hand pads 10, 10', and pressing the adhesive layer 18, 30 onto the housing 34 so as to secure the hand pads 10, 10' thereto. The material might also be formulated to stick or attach to the laptop computer without an adhesive but with surface tack or static charge.

In accordance with a preferred embodiment as disclosed with reference to FIG. 4, one hand pad 10, 10' is located on each side of a tracking pad 40 located on the top of the keyboard housing 34 adjacent the user. The hand pads 10, 10' are positioned adjacent the lowest row of keys 42 on the keyboard housing 34. The strategic placement of the hand pads 10, 10' enables a user to rest his or her hands on the hand pads 10, 10' while typing and using the tracking pad 40. An additional hand pad 10" is also positioned in front of the tracking pad 40.

The soft hand pads 10, 10' may be used in various locations around the laptop computer 12, notebook, tablet computer or other electronic device. In particular, the soft material is located where the user's fingers, hands, wrists or forearms touch the machine. The soft material provides additional comfort and ergonomics while providing the user with a quality, tactile feel. Some anticipated areas for the soft material include, but are not limited to, the palm rest areas in front of the keyboard and input device on the surface of the laptop computer, the front, side and back edges of the laptop/notebook/tablet computer or other electronic device and the exterior cover and base of the laptop/notebook/tablet computer or other electronic device. Placement on the exterior cover and base is particularly useful in tablet computers where the users hands and arms hold the exterior of the machine while using the LCD tablet screen for writing.

In addition to providing support for the user's hands while they rest upon the keyboard housing, it is also contemplated that the hand pads will provide insulation helping to maintain the laptop computer at a desired temperature. The viscoelastic materials disclosed here also absorb shock and vibration from the operation of the laptop computer. This becomes particularly advantageous when the laptop computer is being used on an aircraft or train.

As briefly discussed above, both thermosetting materials (for example, silicone) and thermoplastic materials (for example, KRATON and SANTOPRENE) offer advantages and may be combined for producing the most useful hand pads. With regard to thermosetting materials, the thermoset gel materials, such as silicone, could be used in the following fashion. A thin layer (0.25 mm to 5.0 mm) of the gelatinous material could be cut or molded via a liquid pour into the desired shape. It is likely that this material would be treated with additional chemicals or processes to obtain the desired form and feel. The softness of these gel materials would be less than Shore A 55 and most likely less than 30.

It is expected that this soft thermoset gel would be contained within an elastomeric bag or covering. For example, a very thin (0.10 mm to 1.0 mm) cover sheet could be formed or sealed around the gel material. This cover could be formed from a durable material such as polycarbonate or polyurethane. This cover material would be strong but flexible. It could be easily cleaned and would provide a smooth surface for the users hands.

As briefly discussed above, it is contemplated the thermoplastic materials, such as KRATON and SANTOPRENE, could be injection molded into the desired shapes. These shapes could include various width, height and depth variations. For placement on laptop/note book/tablet computer or electronic devices, the thermoplastic material would be quite thin (0.25 mm to 5.0 mm) depending on the placement. It is also possible that two different thermoplastics could be comolded or overmolded to provide for the desired shape and function. The softness of these thermoplastics would be less than Shore A 55 and would most likely include materials of a 5–30 Shore A Durometer.

Further to the preferred embodiments disclosed above, it is contemplated soft hand pads may be applied to laptop/notebook/tablet computers or electronic devices in other ways. For example, it is contemplated the soft hand pads could be attached in at least four distinct ways. First, the soft elastomer materials could be overmolded or comolded with the native plastics or metals on the surfaces of the laptop computer or other electronic device. Depending on the compatibility, this could result in a very strong bond between the soft and hard materials.

The soft elastomer materials could also be joined to the native plastics or metals through mechanical holds or locks. For example, the hard plastic or metal on the case of the laptop computer or other electronic devices could have holes formed in it. The soft elastomer material would flow into these holes and effectively tie down the soft surface. The design and layout of these holes, channels and/or locks could be specific to the device and its dimensions. Overmolded or comolded parts could also be mechanically attached to the surface of the laptop computer or other electronic device through the use of channels, posts, locks and/or snaps.

A soft elastomeric paint could be used to cover the surfaces of the laptop computer or portable electronic device. The advantages to painting include ease of use and the ability to cover complicated surfaces.

The soft elastomer materials could be attached with adhesives. The first type of adhesive would be a liquid or gel glue. The glue would be applied to the hard surface of the computer laptop or other electronic device and/or the soft surface of the hand pads. It is anticipated that some treatment of the surfaces may be required to ensure a quality bond. The soft material would then be pressed onto the glue and hard surface. The second type would be a repositionable adhesive, possibly in the form of a double sided tape. The first side of the tape would contain a strong adhesive for permanent bonding to the soft hand pad. The second side of the tape would contain a weaker, repositionable adhesive covered by a tape liner or release sheet. In this way, the user could simply peel the tape liner off and stick the soft material pad to the surface of his or her laptop computer or other electronic device. The pads could be pulled on and off and repositioned a number of times.

It is anticipated that various modifications may be used regarding the soft hand pad product. These would include the use of various colors in the materials. Thermochromic agents might also be used. These agents would allow the material to change color while subjected to use and different environments. The hand pads may also incorporate advanced thermal components and elements, such as OUTLAST, a phase change material. These elements would help regulate the temperature of the laptop or other electronic device, perhaps maintaining a desired inside temperature of the machine and giving the user additional comfort in the form of a cooler surface.

While various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A laptop computer, comprising:
   a one-piece, unitary keyboard housing and a monitor, the keyboard housing supporting a plurality of keys for manipulation by a user of the computer; and
   at least one hand pad selectively secured to the keyboard housing, the at least one hand pad being positioned adjacent the plurality of keys for supporting the hand of a user as the user manipulates the plurality of keys;
   wherein the hand pad is a substantially flat viscoelastic pad having a thickness which is no greater than approximately 5.00 mm, the pad includes a bottom surface shaped and dimensioned to rest firmly upon the keyboard housing and a top surface contoured to comfortably support a hand of a user, the hand pad also includes an adhesive layer applied to the bottom surface allowing for ready attachment to the laptop housing.

2. The laptop computer according to claim 1, wherein the hand pad is a viscoelastic solid-phase material.

3. The laptop computer according to claim 2, wherein the viscoelastic solid-phase material is a styrenic thermoplastic elastomer.

4. The laptop computer according to claim 1, wherein the viscoelastic material is a viscous liquid material contained within an elastomeric bag.

5. The laptop computer according to claim 4, wherein the viscous liquid material is a silicone gel or thermoplastic elastomer.

6. The laptop computer according to claim 1, wherein the hand pad has a thickness of approximately 0.25 mm to approximately 5.00 mm.

7. The laptop computer according to claim 1, wherein the hand pad has a thickness which is no greater than approximately 5.00 mm.

8. The laptop computer according to claim 1, wherein the hand pad has a hardness, as measured by a Shore A Durometer, which is less than 55.

9. The laptop computer according to claim 1, wherein the hand pad has a hardness, as measured by a Shore A Durometer, which is between 5 and 30.

10. The laptop computer according to claim 1, wherein the pad includes a thermochromic agent allowing the hand pad to change color during use or a phase change material agent allowing the hand pad to regulate temperatures.

11. A hand pad adapted for selective attachment to a laptop computer, personal digital assistant or other electronic devices, comprising:
    a flat viscoelastic pad having a thickness which is no greater than approximately 5.00 mm, the pad includes a bottom surface shaped and dimensioned to rest firmly upon a machine housing and a top surface contoured to comfortably support a hand of a user;
    an adhesive layer applied to the bottom surface of the pad, the adhesive allowing for ready attachment of the pad to the laptop housing; and
    a release sheet covering the adhesive layer such that the adhesive layer may be protected until such a time that one desires to apply the pad to the laptop computer, personal digital assistant or other electronic device.

12. The hand pad according to claim 11, wherein the pad is a viscoelastic solid-phase material.

13. The hand pad according to claim 12, wherein the viscoelastic solid-phase material is a styrenic thermoplastic elastomer.

14. The hand pad according to claim 11, wherein the viscoelastic material is a viscous liquid material contained within an elastomeric bag.

15. The hand pad according to claim 14, wherein the viscous liquid material is a silicone gel or thermoplastic elastomer.

16. The hand pad according to claim 11, wherein the hand pad has a thickness of approximately 0.25 mm to approximately 5.00 mm.

17. The hand pad according to claim 11, wherein the hand pad has a thickness which is no greater than approximately 5.00 mm.

18. The hand pad according to claim 11, wherein the pad has a hardness, as measured by a Shore A Durometer, which is less than 55.

19. The hand pad according to claim 11, wherein the pad has a hardness, as measured by a Shore A Durometer, which is between 5 and 30.

20. The hand pad according to claim 11, wherein the pad includes a thermochromic agent allowing the pad to change color during use or a phase change material agent allowing the hand pad to regulate temperatures.

* * * * *